(12) United States Patent
Ishikawa et al.

(10) Patent No.: US 8,102,153 B2
(45) Date of Patent: Jan. 24, 2012

(54) BATTERY VOLTAGE ADJUSTING DEVICE

(75) Inventors: Satoshi Ishikawa, Makinohara (JP); Tsutomu Saigo, Susono (JP)

(73) Assignee: Yazaki Corporation, Tokyo (JP)

( * ) Notice: Subject to any disclaimer, the term of this patent is extended or adjusted under 35 U.S.C. 154(b) by 402 days.

(21) Appl. No.: 12/219,895

(22) Filed: Jul. 30, 2008

(65) Prior Publication Data
US 2009/0091297 A1  Apr. 9, 2009

(30) Foreign Application Priority Data
Oct. 3, 2007 (JP) .................................. 2007-259453

(51) Int. Cl.
*H02J 7/00* (2006.01)
(52) U.S. Cl. ......................... 320/134; 320/150; 903/903
(58) Field of Classification Search .................. 320/104, 320/134; 340/636.18
See application file for complete search history.

(56) References Cited

U.S. PATENT DOCUMENTS 5,412,323 A * 5/1995 Kato et al. ..................... 324/429
5,504,415 A * 4/1996 Podrazhansky et al. ...... 320/118

FOREIGN PATENT DOCUMENTS
JP 2000-209782 7/2000

* cited by examiner

*Primary Examiner* — Arun Williams
(74) *Attorney, Agent, or Firm* — Edwards Wildman Palmer LLP

(57) ABSTRACT

The battery voltage adjusting device includes: a voltage detecting means provided corresponding to a block including at least one unit cell of an on-vehicle high voltage battery consisting of a plurality of the unit cells connected in series and detecting a terminal voltage of the unit cell in the block; a charge-discharge means charging or discharging the unit cell in the block on the basis of the terminal voltage of the unit cell detected by the voltage detecting means; a temperature detecting means detecting a temperature of the unit cell; and a changing means changing a time period, from a time point when the charge-discharge means finishes to charge or discharge the unit cell to a time point when the voltage detecting means detects the terminal voltage of the unit cell, on the basis of the temperature of the unit cell detected by the temperature detecting means.

4 Claims, 3 Drawing Sheets

US 8,102,153 B2

BATTERY VOLTAGE ADJUSTING DEVICE

BACKGROUND OF THE INVENTION (1) Field of the Invention

The present invention relates to a battery voltage adjusting device and particularly, to a battery voltage adjusting device, which equalizes an on-vehicle high voltage battery consisting of a plurality of unit cells connected in series.

(2) Description of the Related Art

Recently, a hybrid electric vehicle (hereinafter, HEV), which travels using both of an engine and an electrically-powered motor, has been widely spread. The HEV is equipped with two kinds of battery, consisting of a low voltage (about 12 V) battery for starting the engine and a high voltage battery for driving the electrically-powered motor. The high voltage battery consists of a plurality of unit cells connected in series, wherein the unit cell includes at least one secondary battery such as a nickel-hydrogen battery or a lithium battery.

As for the high voltage battery, a state of charge (hereinafter, SOC) of each unit cell is equalized after an ignition switch is turned off, so that a dispersion of a SOC of each unit cell is reduced, thereby equalizing a performance of each unit cell. As a method of equalizing a SOC of each unit cell, for example, proposed are a method of adjusting a voltage by discharging a unit cell having a high voltage or a method in which a value of SOC, for making a dispersion of SOC of respective unit cells constituting a combined battery determined on the basis of a temperature of the combined battery be smaller than a predetermined dispersion, is set to be a target SOC value, thereby performing control, like a charge-discharge control device of a combined battery disclosed in Japanese Patent Application No. 2000-209782.

The equalization of a SOC is carried out by adjusting a dispersion of a voltage via detection of a voltage of each unit cell followed by a charge and discharge. However, since a unit cell (i.e. battery) experiences a voltage drop during a discharge due to an internal resistance as shown in FIG. 4, therefore a terminal voltage of the battery becomes lower than an open circuit voltage (hereinafter, OCV) that is a stable voltage. When the discharge is stopped, an electrochemical component of an internal resistance component remains as a voltage and the terminal voltage recovers with a time lag. That is, the terminal voltage of the battery does not immediately become an OCV after the discharge is stopped, but gradually approaches the OCV with a time lag. This time lag corresponds to a waiting time for obtaining a stable voltage (i.e. for obtaining stability of voltage), which is different depending on a temperature of the battery. During a charge, a similar phenomenon takes place as well. Therefore, when judging a dispersion of a voltage upon the equalization, the waiting time for obtaining a stable voltage must be taken into consideration since the equalization can be correctly carried out on a condition that the voltage is stable.

As described above, the waiting time for obtaining a stable voltage is different depending on a temperature of the battery. The lower the temperature of the battery, the longer the waiting time. Therefore, so far, the waiting time for obtaining a stable voltage is uniformly set taking the lowest temperature within a usable temperature range into consideration. However, in such a case, it also takes a long period of time before performing the equalization when the battery temperature is high, causing a problem that a dark current is increased.

In the charge-discharge control device of a combined battery disclosed in Japanese Patent Application No. 2000-209782, the target SOC for making a dispersion of a battery voltage converge is changed on the basis of the battery temperature and no measure is taken into consideration as to the waiting time for obtaining a stable voltage. Therefore, there is a problem that it takes a long period of time before performing the equalization when the battery temperature is high or a problem that the voltage is detected when the voltage is not stable, causing an increase in a dark current and a problem that a correct equalization cannot be carried out.

SUMMARY OF THE INVENTION

It is therefore an objective of the present invention to solve the above problem and to provide a battery voltage adjusting device, by which the equalization can be carried out with the most suitable time on a condition of various temperatures taking the waiting time for obtaining a stable voltage into consideration when the equalization of a high voltage battery consisting of a plurality of unit cells connected in series is carried out.

In order to attain the above objective, the present invention is to provide a battery voltage adjusting device including:

a voltage detecting means, which is provided corresponding to a block including at least one unit cell of an on-vehicle high voltage battery consisting of a plurality of the unit cells connected in series and detects a terminal voltage of the unit cell in the block;

a charge-discharge means, which charges or discharges the unit cell in the block on the basis of the terminal voltage of the unit cell detected by the voltage detecting means;

a temperature detecting means, which detects a temperature of the unit cell; and a changing means, which changes a time period, from a time point when the charge-discharge means finishes to charge or discharge the unit cell to a time point when the voltage detecting means detects the terminal voltage of the unit cell, on the basis of the temperature of the unit cell detected by the temperature detecting means.

With the construction described above, the time period, from a time point when the charge-discharge means finishes to charge or discharges the unit cell to a time point when the voltage detecting means detects a terminal voltage of the unit cell, that is, a waiting time for obtaining a stable voltage can be changed by a temperature of the unit cell. Therefore, the equalization can be carried out with the most suitable waiting time for obtaining a stable voltage on a condition of various temperatures. Accordingly, a dark current can be reduced in comparison with a case in which a specific waiting time for obtaining a stable voltage is set on a condition of low temperature.

The changing means changes the time period, from a time point when the charge-discharge means finishes to charge or discharge the unit cell to a time point when the voltage detecting means detects a terminal voltage of the unit cell, on the basis of the temperature of the unit cell detected by the temperature detecting means and a capacity of a charge or discharge performed by the charge-discharge means.

With the construction described above, the waiting time for obtaining a stable voltage can be precisely determined, therefore the equalization of the unit cell can be carried out with the most suitable waiting time for obtaining a stable voltage.

The changing means changes a time period, from a time point when an ignition switch of a vehicle is turned off to a time point when the voltage detecting means detects a terminal voltage of the unit cell, on the basis of the temperature of the unit cell detected by the temperature detecting means.

With the construction described above, the voltage detection before the equalization can be correctly carried out, therefore the equalization of the unit cell can be carried out with the most suitable waiting time for obtaining a stable voltage.

DESCRIPTION OF THE PREFERRED EMBODIMENTS

Figure 1:
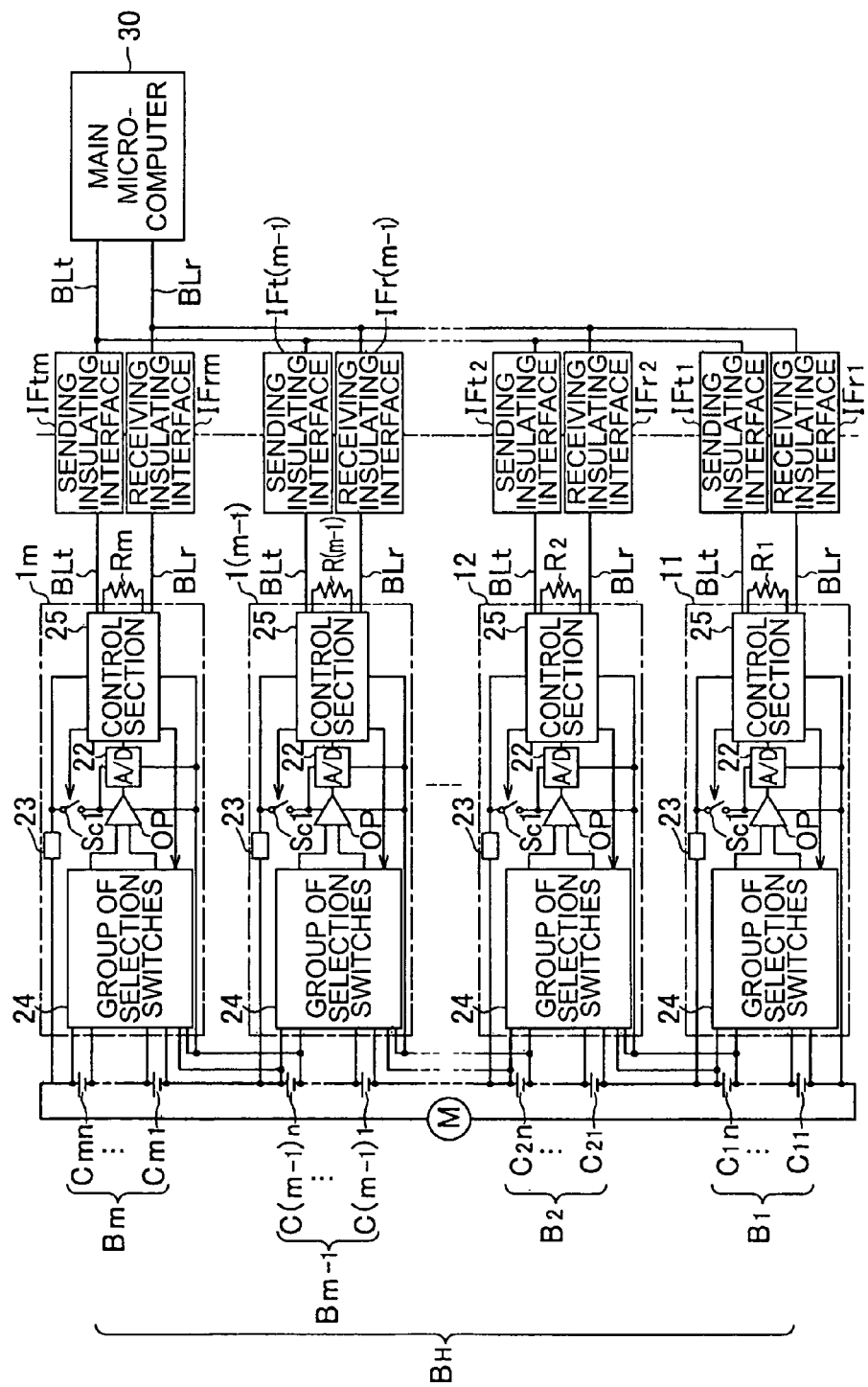
FIG. 1 is a circuit diagram illustrating a battery voltage adjusting device according to a preferred embodiment of the present invention.

In the following, the preferred embodiments of the present invention will be explained with reference to the attached drawings. FIG. 1 is a circuit diagram illustrating a battery voltage adjusting device according to a preferred embodiment of the present invention. A reference numeral BH denotes a high voltage battery. The high voltage battery BH is used as a power supply for an electrically-powered motor M in a HEV, which uses an engine and the electrically-powered motor M as a driving source for traveling. Both ends of the high voltage battery BH are connected to the electrically-powered motor M as a load according to a need and to an alternator (not shown in the figure) or the like as a battery charger according to a need.

The high voltage battery BH is divided into m blocks B1-Bm (m: integer). Each block of the blocks B1-Bm consists of n unit cells of cells C11-Cmn (n: integer). Each unit cell of the cells C11-Cmn includes at least one secondary battery.

The battery voltage adjusting device includes: voltage detecting circuits 11-1m as the voltage detecting means plus charge-discharge means plus temperature detecting means; a main microcomputer 30 as the changing means; sending insulating interfaces IFt1-IFtm; and receiving insulating interfaces IFr1-IFrm.

The voltage detecting circuits 11-1m correspond to the respective blocks B1-Bm. The voltage detecting circuits 11-1m act by being supplied a power supply from the corresponding unit cells C11-Cmn, which constitute the respective blocks B1-Bm.

Each voltage detecting circuit includes: a differential amplifier OP detecting a terminal voltage of the whole of a corresponding block and a terminal voltage of each unit cell in the corresponding block; a group of selection switches 24 selectively connecting both ends of each block and both ends of each unit cell constituting a corresponding block to the differential amplifier OP; A/D converters 22 digital-converting the terminal voltage detected by the differential amplifier OP; and control sections controlling the group of the selection switches 24. The group of the selection switches 24 are constituted by normally closed switches provided at both ends of the unit cell.

The voltage detecting circuits 11-1m include: respective high voltage power circuits 23 outputting a constant voltage, which are action power supply for the differential amplifier OP, A/D converters 22 and control sections 24 from supplied voltage of the corresponding blocks; and breaker switches Sc1 provided between the corresponding high voltage power circuits 23 and the corresponding differential amplifier OP and A/D converters 22. The control section 25 controls an on/off action of the corresponding breaker switch Sc1.

Each voltage detecting circuit is composed of one chip. The voltage detecting circuits 11-1m are connected to corresponding external resistances R1-Rm. The external resistances R1-Rm correspond to addresses of the respective blocks B1-Bm and have different vales from each other. The control section 25 reads out a resistance value of the corresponding external resistance in response to introduction of power from the respective high voltage power circuit 23 and stores the read-out resistance value as an address of each voltage detecting circuit in a memory (not shown in the figure).

The main microcomputer 30 has a CPU and memory (not shown in the figure) therein. The CPU performs control of the voltage detecting circuits 11-1m on the basis of a control program installed in the memory.

A sending bus line BLt and receiving bus line BLr are provided between each voltage detecting circuit 11-1m and the main microcomputer 30. The sending bus line BLt and receiving bus line BLr lo are provided diverging from the main microcomputer 30 toward a plurality of voltage detecting circuits 11-1m. The sending bus line BLt and receiving bus line BLr after their divergence are provided with sending insulating interfaces IFt1-IFtm and receiving insulating interfaces IFt1-IFtm, respectively.

The sending insulating interfaces IFt1-IFtm and receiving insulating interfaces IFt1-IFtm connect the voltage detecting circuits 11-1m to the main microcomputer 30 on a condition of being electrically insulated. That is, the voltage detecting circuits 11-1m and the main microcomputer 30 can carry out sending/receiving of data on a condition of being electrically insulated from each other by means of the sending insulating interfaces IFt1-IFtm and the receiving insulating interfaces IFt1-IFtm. Thereby, the insulation between the high voltage battery and the low voltage battery (not shown in the figure) supplying power to the main microcomputer 30 can be maintained. As the sending insulating interfaces IFt1-IFtm and the receiving insulating interfaces IFt1-IFtm, known are, for example, a device in which light is used as a medium such as a photo-coupler consisting of a light-emitting device and light-receiving device or a device in which magnetism is used as a medium such as a magnetic coupler.

Figure 2:
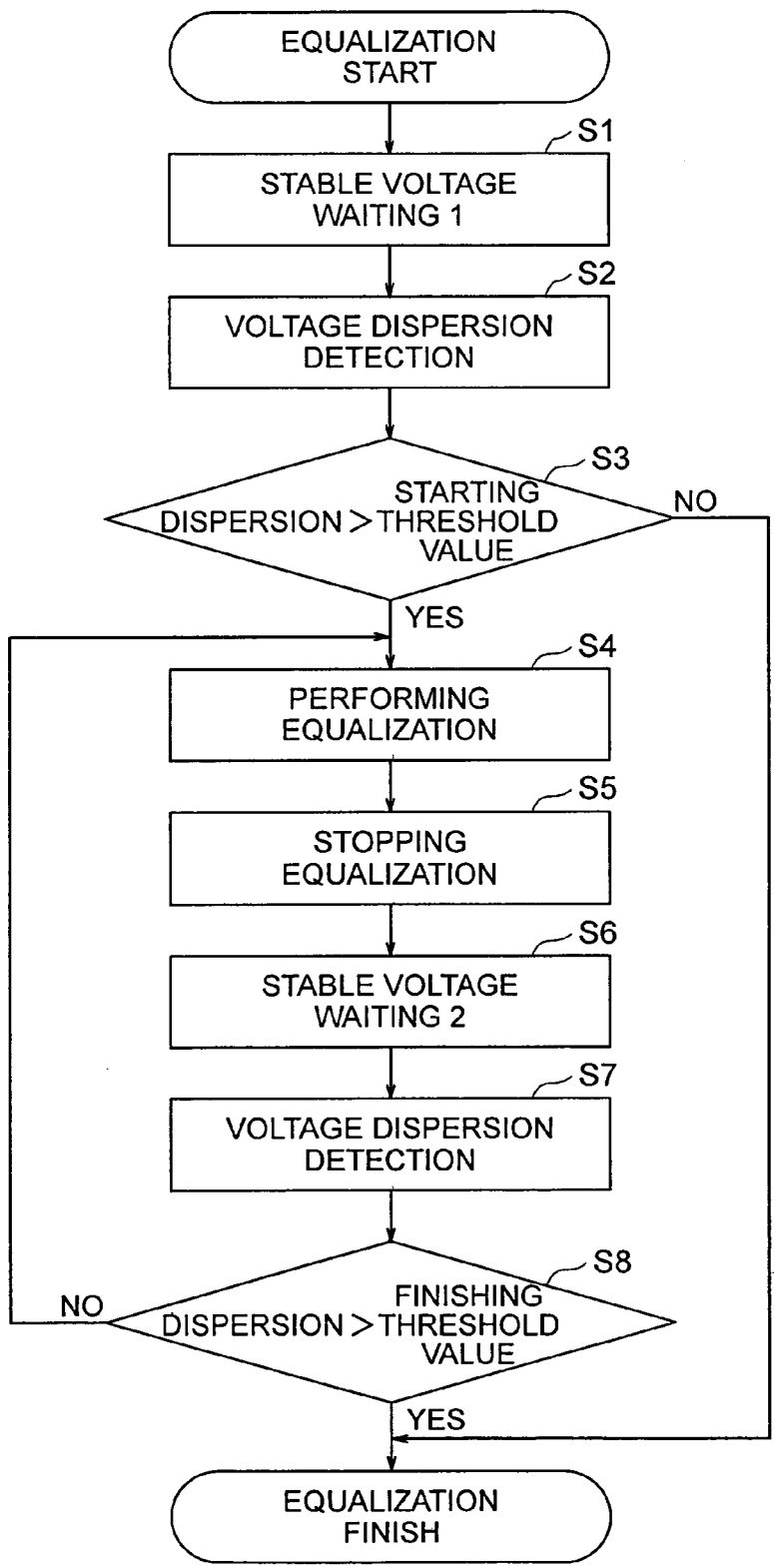
FIG. 2 is a flow chart illustrating a sequence of an equalization processing of a high voltage battery in the battery voltage adjusting device shown in FIG. 1.

A sequence of the equalization processing of the high voltage battery BH in the battery voltage adjusting device having a construction described above is explained with reference to a flow chart shown in FIG. 2. The flow chart shown in FIG. 2 is carried out in the main microcomputer 30 after the ignition switch of the HEV is turned off.

First, at step S1, the waiting time for obtaining a stable voltage (i.e. the time period from a time point when the ignition switch of a vehicle is turned off to a time point when the voltage detecting means detects a terminal voltage of the unit cell), with respect to a change in the voltage due to the charge or discharge during the ignition switch of a vehicle being turned on, is permitted to pass and then, the processing advances to step S2. In detail, the voltage detecting circuits 11-1m are instructed to detect temperatures of the respective unit cells C11-Cmn in the respective blocks B1-Bm. The voltage detecting circuits 11-1m detect temperatures of the respective unit cells C11-Cmn by means of sensors attached to the respective blocks B1-Bm, output the detected temperatures to the main microcomputer 30, and set the waiting time for obtaining a stable voltage read out from a correlation table between temperature and waiting time for obtaining a stable voltage in advance set in a memory in the main microcomputer 30 on the basis of the detected temperatures of the unit cells C11-Cmn, then the waiting time for obtaining a stable voltage is permitted to pass. That is, the time period, from a time point when the ignition switch of a vehicle is turned off to a time point when the voltage detecting means detects a terminal voltage of the unit cell, is changed on the basis of the temperatures of the unit cells C11-Cmn detected by the temperature detecting means.

At step S2, the voltage detecting circuits 11-1m are instructed to detect terminal voltages of the unit cells C11-Cmn so that a dispersion of the voltage among the unit cells is detected, then the processing advances to step S3.

At step S3, it is judged whether or not the dispersion of the voltage detected at the step S2 is larger than a predetermined threshold value (starting threshold value) for starting the equalization. When judged larger (YES in flow chart), the processing advances to step S4. When judges not larger (NO in flow chart), the equalization is finished.

At step S4, the equalization is carried out, then the processing advances to step S5. In the equalization, voltage detecting circuits 11-1m permit the unit cells having a high voltage value among the voltage values of the unit cells C11-Cmn detected at step S2 to discharge for a predetermined time period so as to reduce the dispersion of the voltage.

At step S5, the equalization is stopped, then the processing advances to step S6. That is, since the predetermined time period of discharge is passed, the discharge is stopped, then the processing advances to the next step (i.e. step S6).

At step S6, the waiting time for obtaining a stable voltage (i.e. the time period from a time point when the charge-discharge means finishes to charge or discharges the unit cell to a time point when the voltage detecting means detects a terminal voltage of the unit cell, on the basis of temperatures of the unit cell detected by the temperature detecting means) with respect to a change in the voltage due to the discharge during the equalization, is permitted to pass and then, the processing advances to step S7. In detail, similarly to step S1, the voltage detecting circuits 11-1m are instructed to detect temperatures of the respective unit cells C11-Cmn in the respective blocks B1-Bm. The voltage detecting circuits 11-1m detect temperatures of the respective unit cells C11-Cmn by means of sensors attached to the respective blocks B1-Bm, output the detected temperatures to the main microcomputer 30, and set the waiting time for obtaining a stable voltage read out from a correlation table between temperature and waiting time for obtaining a stable voltage in advance set in a memory in the main microcomputer 30 on the basis of the detected temperatures of the unit cells C11-Cmn, then the waiting time for obtaining a stable voltage is permitted to pass. That is, the time period, from a time point when the charge-discharge means finishes to charge or discharges the unit cell to a time point when the voltage detecting means detects a terminal voltage of the unit cell, is changed on the basis of the temperatures of the unit cells detected by the temperature detecting means.

Figures 3, 4:
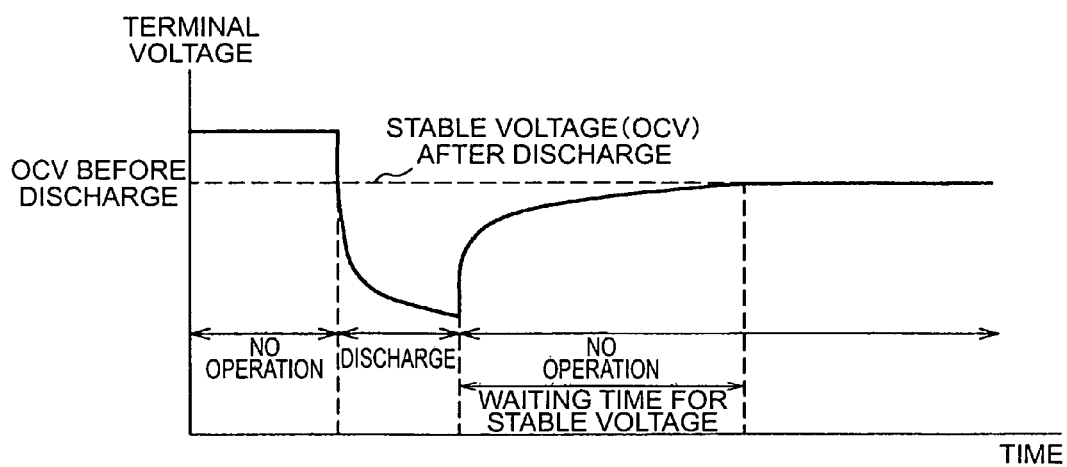
FIG. 3 is an example of a table for setting a waiting time for obtaining a stable voltage by means of a temperature of a unit cell and of a discharge capacity.
FIG. 4 is an illustration of a waiting time for obtaining a stable voltage of a unit cell.

In this connection, the waiting time for obtaining a stable voltage may be set by using a table based on a charge or discharge capacity during the equalization as shown in FIG. 3, instead of being set only on the basis of the detected temperatures. That is, the time period, from a time point when the charge-discharge means finishes to charge or discharges the unit cell to a time point when the voltage detecting means detects a terminal voltage of the unit cell, may be changed on the basis of both of the temperatures of the unit cells detected by the temperature detecting means and the charge or discharge capacity performed by the charge-discharge means.

At step S7, similarly to step 2, the voltage detecting circuits 11-1m are instructed to detect terminal voltages of the unit cells C11-Cmn so that a dispersion of the voltage among the unit cells is detected, then the processing advances to step S8.

At step S8, it is judged whether or not the dispersion of the voltage detected at the step S7 is smaller than a predetermined threshold value (finishing threshold value) for finishing the equalization. When judged smaller (YES in flow chart), the equalization is finished. When judges not smaller (NO in flow chart), the processing returns to step S4.

According to the present invention, when the equalization of the high voltage battery BH is carried out, an appropriate waiting time for obtaining a stable voltage is set on the basis of the temperatures of the unit cells C11-Cmn, the dispersion of the voltage is detected after the waiting time for obtaining a stable voltage passes, and the equalization is carried out. Therefore, the equalization, which is based on the stable voltage, can be carried out with the most suitable waiting time for obtaining a stable voltage on a condition of various temperatures.

Since the most suitable waiting time for obtaining a stable voltage is set on the basis of the temperatures of the unit cells C11-Cmn, therefore a dark current can be reduced in comparison with a case in which a specific waiting time for obtaining a stable voltage is set on a condition of low temperature.

Since the waiting time for obtaining a stable voltage can be determined on the basis of both of the temperatures of the unit cells C11-Cmn detected by the voltage detecting circuits 11-1m and the charge or discharge capacity during the equalization processing, therefore the waiting time for obtaining a stable voltage can be determined precisely and the equalization of the unit cells C11-Cmn can be carried out with the most suitable waiting time for obtaining a stable voltage.

Since the waiting time for obtaining a stable voltage from a time point when an ignition switch of a vehicle is turned off to a time point when the equalization is carried out is changed on the basis of the temperatures of the unit cells, therefore the voltage before the equalization can be detected precisely and the equalization of the unit cells can be carried out with the most suitable waiting time for obtaining a stable voltage.

In the preferred embodiment described above, a case in which the unit cells C11-Cmn are subjected to a discharge is explained. However, instead, the present invention can also be applied in a case in which the unit cells C11-Cmn are subjected to a charge. That is, the waiting time for obtaining a stable voltage may be determined from both of the temperatures of the unit cells C11-Cmn and the charge capacity, so that the voltage is detected after the waiting time for obtaining a stable voltage passes.

The aforementioned preferred embodiments are described to aid in understanding the present invention and variations may be made by one skilled in the art without departing from the spirit and scope of the present invention.

What is claimed is:

1. A battery voltage adjusting device comprising:
  a voltage detecting means, which is provided corresponding to a block including at least one unit cell of an on-vehicle high voltage battery consisting of a plurality of the unit cells connected in series and detects a terminal voltage of the unit cell in the block;
  a charge-discharge means, which charges or discharges the unit cell in the block on the basis of the terminal voltage of the unit cell detected by the voltage detecting means;
  a temperature detecting means, which detects a temperature of the unit cell; and a changing means, which changes a length of a time period to be elapsed between a first point in time, when the charge-discharge means finishes to charge or discharge the unit cell, and a second point in time, when the voltage detecting means detects the terminal voltage of the unit cell, based on the temperature of the unit cell detected by the temperature detecting means.

2. The device according to claim 1, wherein the changing means changes the length of the time period to be elapsed between the first point in time, when the charge-discharge means finishes to charge or discharge the unit cell, and the second point in time, when the voltage detecting means detects a terminal voltage of the unit cell, based on the temperature of the unit cell detected by the temperature detecting means and a capacity of a charge or discharge performed by the charge-discharge means.

3. The device according to claim 1, wherein the changing means changes the length of the time period to be elapsed between the first point in time, when an ignition switch of a vehicle is turned off, and the second point in time, when the voltage detecting means detects a terminal voltage of the unit cell, based on the temperature of the unit cell detected by the temperature detecting means.

4. The device according to claim 2, wherein the changing means changes the length of the time period to be elapsed between the first point in time, when an ignition switch of a vehicle is turned off and the second point in time, when the voltage detecting means detects a terminal voltage of the unit cell, based on the temperature of the unit cell detected by the temperature detecting means.

* * * * *